United States Patent [19]
Okui

[11] Patent Number: 5,004,223
[45] Date of Patent: Apr. 2, 1991

[54] DOCUMENT CONVEYANCE APPARATUS FACILITATING CONVEYANCE BELT REPLACEMENT

[75] Inventor: Susumu Okui, Hachioji, Japan

[73] Assignee: Konica Corporation, Tokyo, Japan

[21] Appl. No.: 429,502

[22] Filed: Oct. 31, 1989

[30] Foreign Application Priority Data

Nov. 2, 1988 [JP] Japan .................. 63-278751

[51] Int. Cl.⁵ .................. B65H 5/02; B65G 23/44
[52] U.S. Cl. .................. 271/275; 271/7; 271/198; 198/816; 198/835
[58] Field of Search .................. 198/813, 186, 835; 271/3.1, 6, 7, 34, 264, 275, 198; 355/308

[56] References Cited

U.S. PATENT DOCUMENTS

| | | | |
|---|---|---|---|
| 4,185,908 | 1/1980 | Taylor et al. | 271/275 |
| 4,444,382 | 4/1984 | Ishikawa et al. | 271/10 |
| 4,650,067 | 3/1987 | Brulé | 198/816 |
| 4,674,735 | 6/1987 | DuBois et al. | 271/111 |
| 4,844,445 | 7/1989 | Murata et al. | 271/198 |
| 4,881,633 | 11/1989 | Cailey et al. | 198/816 |

FOREIGN PATENT DOCUMENTS

2758213C3 7/1978 Fed. Rep. of Germany.

*Primary Examiner*—Robert P. Olszewski
*Assistant Examiner*—Steven Reiss
*Attorney, Agent, or Firm*—Finnegan, Henderson, Farabow, Garrett, and Dunner

[57] ABSTRACT

A document conveyance apparatus for conveying a document to an exposing surface of a copying apparatus, and conveying the document out from the exposing surface after an exposure to copy the document. The apparatus including a driving roller unit for supporting and driving a conveyance belt, including (i) at least a pair of driving rollers, rotatably mounted on a conveyance frame with first supporters, for driving the conveyance belt suspended thereon, wherein at least one of the driving rollers is driven by a driving motor, (ii) the first supporters for supporting both ends of the driving rollers, wherein each of the driving rollers is supported movable in the direction of its axis of rotation so that at least one end of the driving rollers is capable of being removed from the roller supporters, and (iii) a positioner for being mounted on each of the driving rollers so that each of the driving rollers is positioned in the direction of its axis of rotation.

8 Claims, 6 Drawing Sheets

DOCUMENT CONVEYANCE APPARATUS FACILITATING CONVEYANCE BELT REPLACEMENT

BACKGROUND OF THE INVENTION

The present invention relates to an automatic conveyance apparatus for a document in a copying machine such as an machine, and particularly to the mechanism for replacing a document-conveying endless belt.

A document conveyance apparatus is normally used, after being installed on the document table of a copying machine or the like, to convey the sheet type documents (hereinafter called a document) automatically. When it is in an open state, the manual operation for documents is possible.

Documents loaded on the document feeding table (sheet feeding tray) are fed out one by one by means of a sheet-feeding section of a document conveyance apparatus, and each of them is fed and positioned, by means of a conveyance belt in the conveyance section, on the document-placing table glass (platen glass) where the document is exposed to light from the exposure lamp provided in the main body of a copying machine, and then is further ejected onto the document-exit tray.

On a document conveyance apparatus such as this, there are provided many rollers rotatably supported on frame side plates, such as, for example, conveyance rollers composed of a belt-driving roller, a driven roller, a tension roller, a pressure roller or the like as well as a sheet-feeding roller and a sheet-exit roller. A conveyance belt composed of one or a plurality of belts used for the conveyance of a document is spread between the aforesaid conveyance rollers.

In such a mechanism of a document conveyance apparatus, when removing and replacing the aforesaid conveyance belt and various rollers on the occasion of assembly, periodic inspection or apparatus troubles, there have been required complicated procedures and much labor and time have been consumed and it has been difficult to keep the assembling accuracy stably. In particular, the surface of the aforesaid conveyance belt which must be kept white constantly needs to be replaced with a new one occasionally, because it is easily soiled and scratched while it is used. Further, after the conveyance belt is used for a long time, it also needs to be replaced with a new one because of its deformation and change in quality.

In one of the conventional methods for replacing a conveyance belt, the outer casings of a document conveyance apparatus are removed first, then bearings and others are removed from the roller-supporting side plate, and all rollers passing through the inside of a loop shaped conveyance belt are removed, thereby the loop of a conveyance belt is released.

In this method, the side plate of a frame is separated in advance occasionally. Further, a driving roller naturally needs to be removed. Therefore, a mechanism for separating the driving roller from the driving system needs to be prepared, which causes a complicated mechanism and difficult work.

Even in the case of a document conveyance apparatus of a monocoque structure type wherein outer casings play a role of a structural member, bearings for each roller, various panels located at the bottom of an apparatus and casings need to be removed first, and then, all rollers are removed for the replacement of a conveyance belt.

Furthermore, when replacing a conveyance belt, a driven roller and others need to be moved for adjusting to a proper belt tension because there is a difference between the incoming and outgoing conveyance belts in terms of a total length of an endless belt. Even in this case, disassembling work identical to the above has been needed.

From the viewpoint of an easy process for replacing a conveyance belt and rollers and of an assurance of functions after the replacement, it is desired that the replacing work is easy, the time required for the replacement is short and readjustments for sensors and parts are not needed. Namely, the mechanism that makes a simple and efficient replacement possible is desired.

The conventional mechanism, however, does not always satisfy fully the above desired points due to its weak points mentioned previously.

SUMMARY OF THE INVENTION

An object of the present invention is to provide a document conveyance apparatus wherein the replacement work for a conveyance belt is simplified and the time required for the replacement is shortened for the achievement of an easy replacement work, and accuracy of assembled apparatus after the replacement can be assured.

The aforesaid object of the invention can be achieved by a document conveyance apparatus having therein an endless belt for document conveyance that is spread between a driving roller and a driven roller and feeds a document from a document feeding section to an exposure section and further ejects the document after the completion of exposure, wherein a thrust-regulating member is provided detachably in the vicinity of the shaft-end of each of aforesaid driving roller and driven roller, and thereby the aforesaid endless belt can be spread on or removed from both rollers when the thrust-regulating members are removed and the aforesaid driving roller and driven roller are pulled to one side where bearings are provided.

Further, aforesaid object of the invention can be achieved by a document conveyance apparatus having therein an endless belt for document conveyance that is spread between a driving roller and a driven roller and feeds a document from a document feeding section to an exposure section and further ejects the document after the completion of exposure, wherein a movement-adjusting member is adjusted from the outside through the through-hole on an outer casing of the document conveyance apparatus while a panel supporting the aforesaid driven roller is held moveably by means of the movement-adjusting member, and thus the tension of the aforesaid endless belt is adjusted.

DETAILED DESCRIPTION OF THE PREFERRED EMBODIMENT

Hereunder, the present invention will be explained, referring to an example shown in the attached drawings.

Figure 3:
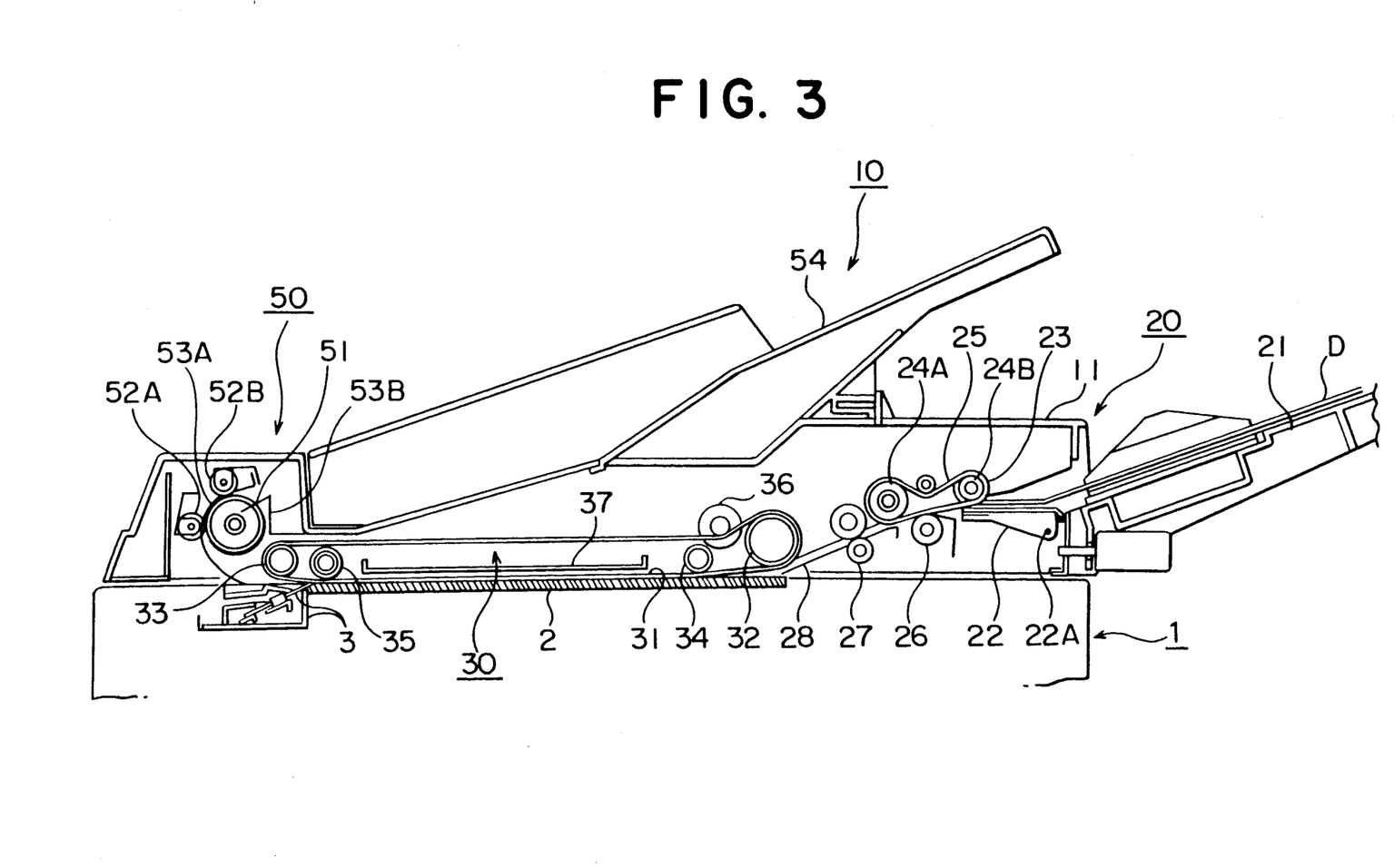
FIG. 3 is a sectional view of a document conveyance apparatus of the invention.

FIG. 3 shows a cross section of a document conveyance apparatus of the present invention illustrating a conveying system of sheet type documents.

In the figure, 1 is a copier main body, 2 is a platen glass (a document placing table glass, hereunder called a document table), 3 is a stopper board for the leading edge of a document (hereunder, it is called a document stopper). The document conveyance apparatus 10 is placed on the document table 2. The document conveyance apparatus 10 is attached to the hinge part on the upper part of the copier main body 1 being able to be moved round, and make the upper surface of the document table 2 open and close freely. The aforesaid document conveyance apparatus 10 is composed of the document feeding part (a document feeding means) 20, the conveyance part (a document conveyance means) 30, and the document ejecting part (a sheet ejecting means) 50.

On the front right side of the aforesaid document conveyance apparatus 10, a document feeding tray 21 is provided detachably.

To the prescribed position of the upper surface of it, one or more than one sheets of documents D are placed. By the rotation of the solenoid for sheet-feeding and the link (both of them are not illustrated) which are operated by pushing the copy button (not illustrated) of the copier main body, the movable sheet-feeding tray 22 is rotated upward around the pivot axis 22A and presses the feeding roller 23 of the first sheet-feeding part which starts to rotate simultaneously.

By this, the leading edge of the document D on the movable paperfeeding plate 22 is pressed by the feeding roller 23 and the movable sheet-feeding tray 22 to be fed. By cooperation of the drive motor 24A, the driven motor 24B, the feeding belt (a separation belt) 25 and the fanning roller 26 (a roller for preventing double feeding), only one sheet of document which is placed on the top of the documents is fed.

One sheet of the document D to be fed is conveyed along the guide plate 28 by a pair of the second paper feeding rollers 27.

It is conveyed to be put between the conveyance belt 31 rotating in the conveyance part 30 and the document table 2 on the upper surface of the copier 1. It stops at the position where the leading edge of the document D hits the document stopper 3.

The material of the conveyance belt 31 is selected considering impact resilience, extension rate, tensile strength and internal tearing strength from the viewpoint of extension and deformation, and considering softness and heat-resistance not to damage to the document table 2. It is finally selected by experiment wherein materials such as fluorine-contained rubber filled with white pigment, silicone rubber, acrylic rubber, urethane rubber, nitrylbutyl rubber and natural rubber and design conditions of the document conveyance apparatus such as tension to be added, friction coefficient, thickness of belt, width of belt, total length of belt are tested by comparison.

Figure 2:
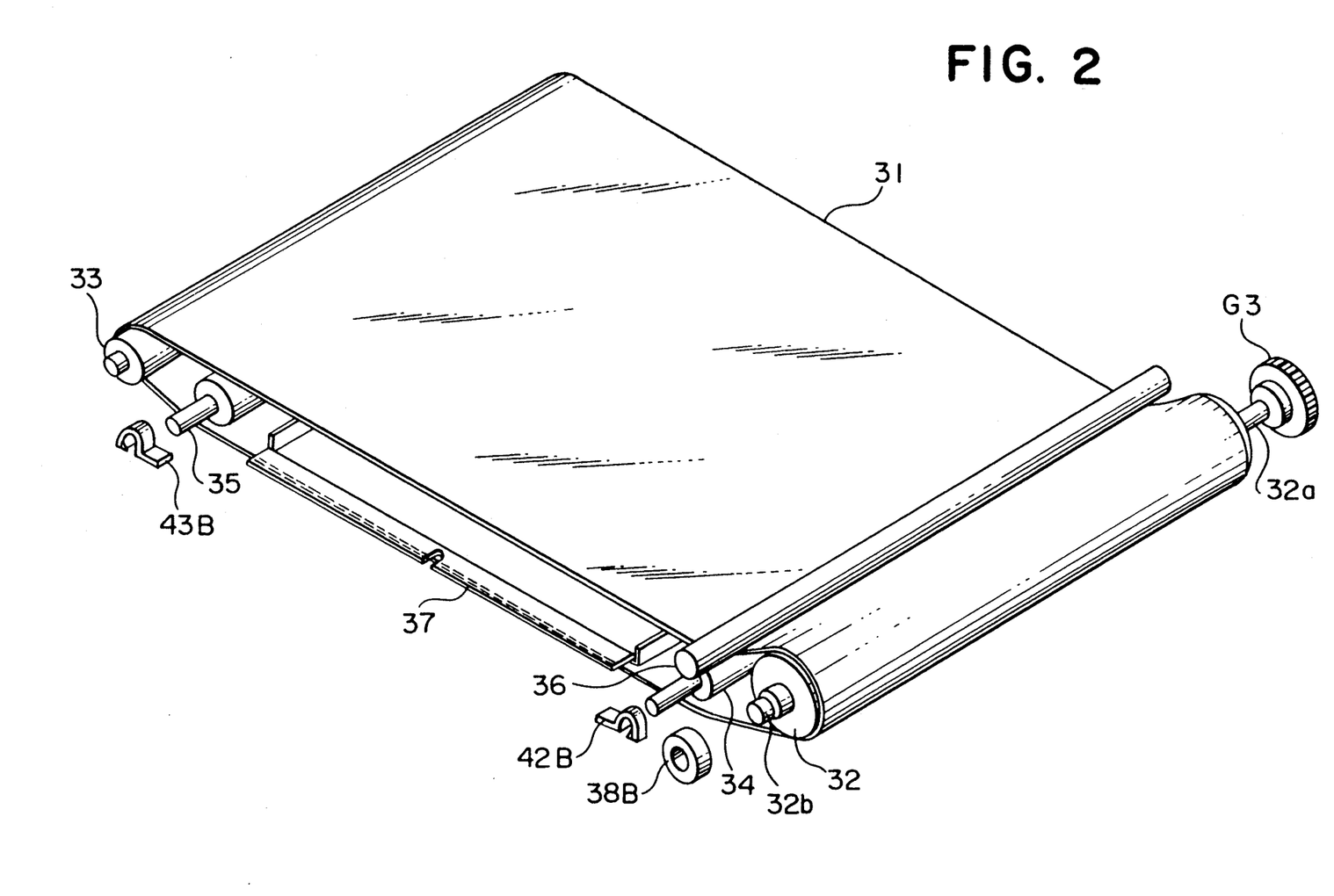
FIG. 2 is a perspective view showing the arrangement of various rollers located around the conveyance belt.

FIG. 2 is a perspective view showing an arrangement of rollers around the conveyance belt 31.

The conveyance belt 31 is spread between the drive roller for belt driving 32, the driven roller 33, the pressure roller for holding document 34 and 35 and the tension roller 36. Besides, the back-up plate 37 which is used when the conveyance belt is cleaned is provided in the loop of the conveyance belt 31.

At the stop position, document D is exposed to light of the exposure lamp in the copier main body. The document image is formed on the recording paper through the optical scanning. And when more than one copy is made from one document, the copier repeats the exposure and image forming successively, while the document remains at the stop position.

When a series of copying action is finished for one document, the steeper face of document stopper 3 withdraws to release the leading edge of document D. The document D is conveyed by the conveyance belt 31 and sheet-ejecting driving roller 51 which begin to rotate again, sheet-ejecting driven rollers 52A and 52B and sheet-ejecting guide plates 53A and 53B, then it is ejected onto the sheet-ejecting tray 54.

Simultaneously with this ejecting action, the second document placed on the documents which are piled on the sheet-feeding tray 21, is delivered onto the document table 2 in the same manner as the case of the document D, and exposure and sheet-ejecting are repeated.

Figure 4:
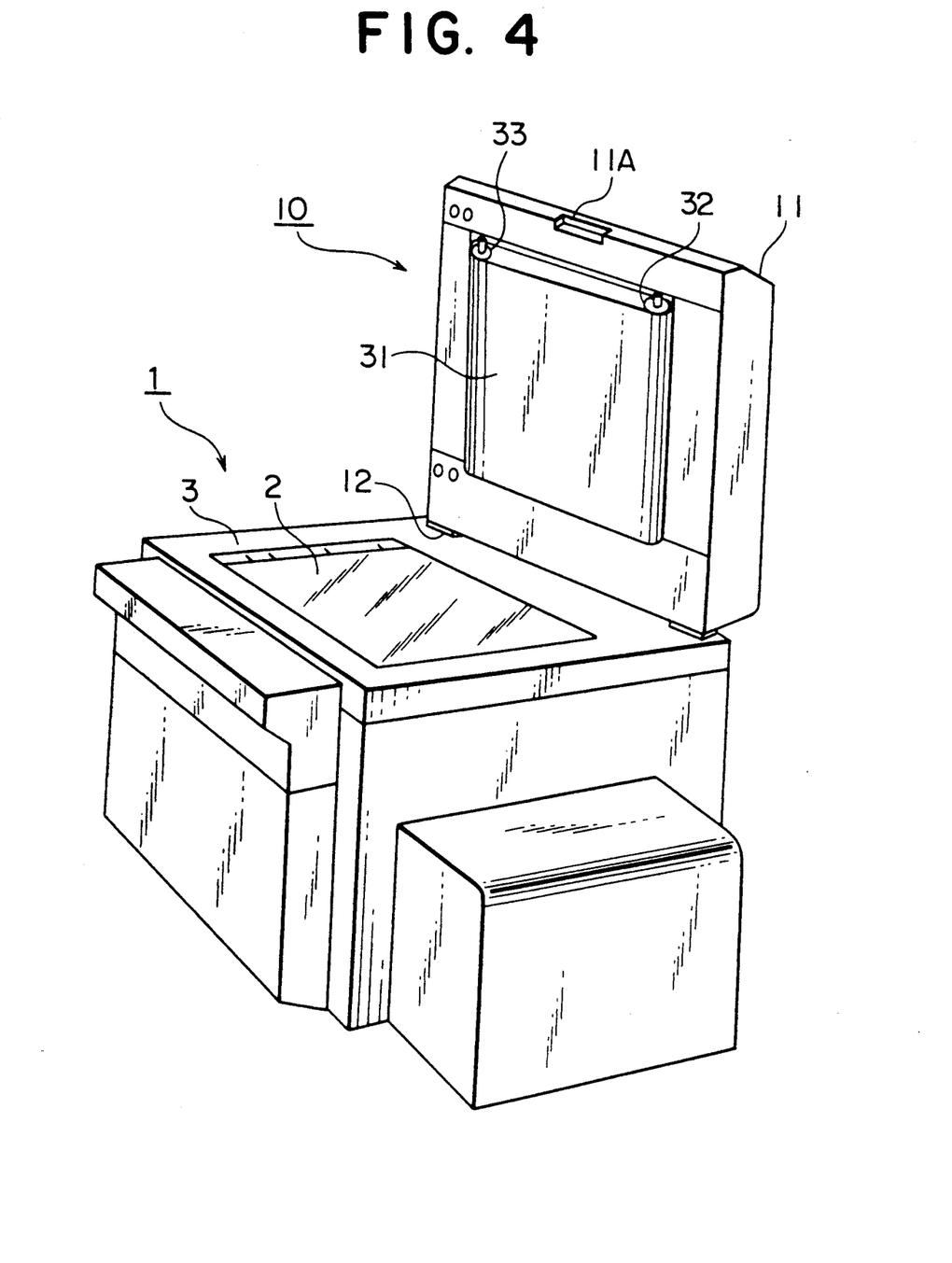
FIG. 4 is a perspective view showing how the conveyance belt is replaCed on a document conveyance apparatus erected.

The lower backside of the document conveyance apparatus 10 and the upper backside of the copier main body 1 are connected through the hinge unit (the hinge member) 12 (refer to FIG. 4. Thus, the document conveyance apparatus can swing freely around the pivot shaft of the hinge member 12.

FIG. 4 is a perspective view illustrating the document conveyance apparatus 10 separated from the document table 2, and opened.

When a three-dimensional document such as a book is copied, or when another document is handled, or when the document table 2 or the conveyance belt 31 is cleaned, or when the position of the document stopper 3 on copier main body 1 is adjusted, or when the inspection, adjustment and repair operation of the optical system inside the main body are conducted. The document conveyance apparatus 10 can be swung round the pivot shaft of the hinge member 12 to be in a standing position as illustrated in FIG. 4 when handle portion 11A of casing member 11 of document conveyance apparatus 10 is lifted.

As explained above, in general classification, the document conveyance apparatus 10 of the invention is composed of the sheet-feeding tray 21, the sheet-feeding parts 22-28, the conveyance parts 31-37, the sheet-ejecting parts 51-53 and the sheet-ejecting tray 54. Among them, the sheet feeding parts, the conveyance parts, and the sheet-ejecting parts are contained in the outer casing 11 together with the drive controlling member and the main body framework member.

Figure 1:
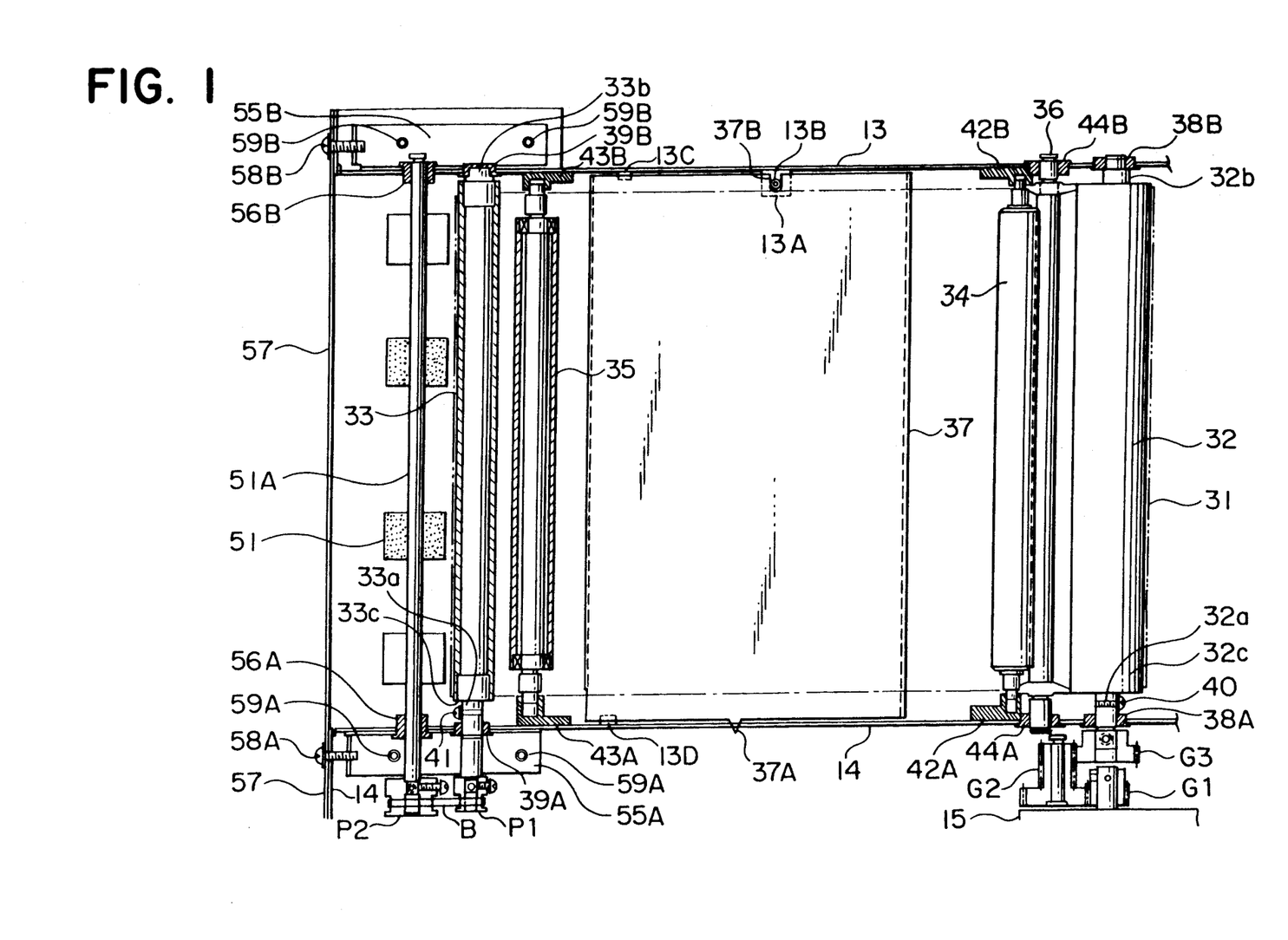
FIG. 1 is a schematic bottom view of the conveyance section of a document conveyance apparatus and also is a front view of the document conveyance apparatus that is erected.

FIG. 1 is a schematic bottom view of the conveyance part 30 wherein the conveyance belt 31 is taken out. In the figure, the conveyance belt 31 is illustrated with a two-dot chain line.

The framework member of document conveyance apparatus 10 is composed of the front panel 13 on the front side, the rear panel 14 on the back side, the sheet-feeding side stay to combine both panels, the conveyance part stay and the sheet-ejecting part stay. Rollers of the sheet-feeding part 20, the conveyance part 30 and the sheet-feeding part 40 are installed between the above-mentioned two panels.

The drive controlling member mentioned above is composed of the drive power source such as the main motor and the sheet-feeding solenoid, the power transmission means such as the gear train, the drive pulley belt and the sheet-feeding clutch and the controlling means such as sensors and control boards, which are arranged in the rear panel 14 of the document conveyance apparatus 10.

The drive power generated from the main motor 15 installed on the rear panel 14 rotates through the gear train, the feeding roller 23, the drive roller 24A and the second sheet-feeding roller 27 all installed on the sheet-feeding part 20. On the other hand, the driving power of the main motor mentioned above rotates driving roller 32 through the gear train in which gear G1 on the main motor shaft engages with intermediate gear G2 which further engages with gear G3 attached to the end of shaft portion 32a that is one end of driving roller 32 in conveyance section 30. The driving roller 32 drives, through the conveyance belt 31, the driven roller 33 to rotate. Further, the timing belt pulley P1 located at the shaft end of driven roller 33 causes, by turning timing belt pulley P2 located at the shaft end of sheet-ejecting driving roller 51 through timing belt B, the sheet-ejecting driving roller 51 to rotate.

Both shaft ends of the aforesaid driving roller 32 are respectively supported rotatably in bearings 38A and 38B provided respectively in front panel 13 and rear panel 14. One shaft portion 32a among them is extended to have gear G3 fixed thereon. Intermediate gear G2 is a gear having a long tooth profile enabling the gear to travel in its axial direction while it engages with gear G3.

On the shaft portion 32a of driving roller 32 at the side where the aforesaid gear G3 is provided, thrust-regulating member 40 is mounted detachably. The thrust-regulating member, for example, is a screw with a washer which can be screwed into the aforesaid shaft portion 32a to be fixed thereon.

Figure 7A:
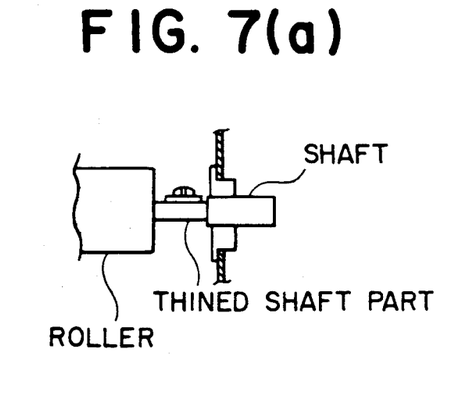
FIG. 7(a) and 7(b) are sectional views showing how a roller is inclined.
Figure 7B:
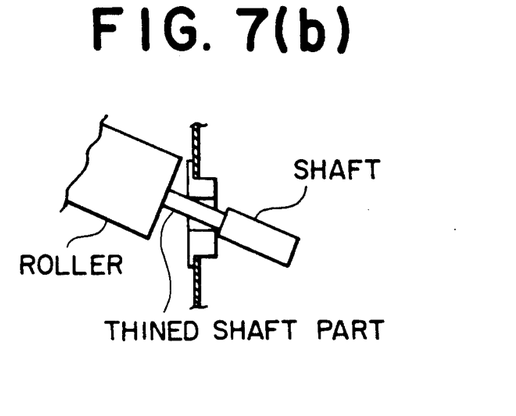

Similarly to driving roller 32, both shaft ends of driven roller 33 also are respectively supported rotatably in bearings 39A and 39B, and one shaft portion 33a among them is provided detachably with thrust-regulating member 41. Each of shaft portions 32a and 33a into which thrust-regulating members 40 and 41 are screwed is provided, as shown in FIG. 7 (a), with a thinned shaft part which allows driving roller 32 or driven roller 33 to be inclined more as shown in FIG. 7 (b), making the replacement of the conveyance belt easier. It is preferable that the thinned shaft part is about 6 mm to 7 mm in diameter for the shaft portion whose diameter is 8 mm.

Both shaft end portions of pressure roller 34 are respectively engaged with supporters 42A and 42B each having a slot, so that the pressure roller may rotate and move along the slot. When the document conveyance apparatus 10 is swung down to cover the document table 2 tightly, pressure roller 34 goes down along the slot because of its own weight, thus pressing the conveyance belt 31 against document table 2. Incidentally, a small protrusion is provided on the open side of the aforesaid slot, so that it may prevent the shaft portion of pressure roller 34 from slipping out of the slot. However, when the pressure roller 34 is pressed relatively strongly, the shaft portion slips out of the small protrusion because the small protrusion is elastic, thus it is possible to take out the pressure roller 34. When installing the pressure roller 34 again, on the other hand, it is possible to cause the shaft portion to clear the small protrusion and to be engaged with the slot, by pushing in the pressure roller with pressure.

Pressure roller 35 and its supporters 43A and 43B on the other side are exactly the same as the aforesaid pressure roller 34 and its supporters 42A and 42B in terms of structure, and accordingly, the explanation of the former will be omitted here.

Backup plate 37 having protrusion 37A on its rear side and recess 37B on its front side is mounted detachably on both front panel 13 and rear panel 14. Namely, the aforesaid protrusion 37A is engaged with a part of rear panel 14 and the peripheral portion of recess 37B is restricted in terms of its movement on protruded flake 13A of front panel 13 by fixing member 13B such as a screw studded on protruded flake 13A. The left side portion of backup plate 37 is pressed against both small protruded flake 13C of front panel 13 and small protruded flake 13D of rear panel 14.

Incidentally, both shaft ends of tension roller 36 with a flange are respectively supported rotatably in bearing 44B provided on front panel 13 and bearing 44A provided on rear panel 14, and the tension roller contacts the outer surface of conveyance belt 31 at its fixed position.

Next, the procedures of replacement for conveyance belt 31 in the document conveyance apparatus of the invention will be explained.

(1) When handle portion 11A located on the front side of document conveyance apparatus 10 is lifted by hand, the document conveyance apparatus 10 swings around the pivot shaft of hinge member 12 and stops at its full opening state of about 90 degrees as shown in FIG. 4. FIG. 1 is a front view of the document conveyance apparatus 10 standing upright as stated above and viewed from the front side, and the figure further shows the main part of conveyance portion 30 excluding conveyance belt 31.

(2) In the upright state of the document conveyance apparatus 10, the pressure roller 34 is to be removed first by sliding it along the each slot of upper and lower bearings 42A and 42B and by overriding each of the small protrusions, and further to be taken out of the inner surface of conveyance belt 31.

(3) The pressure roller 35 is to be taken out similarly.

(4) Next, backup plate 37 is to be lifted and taken out by disengaging the recess portion 37B thereon from fixing member 13B and by releasing the engagement of protrusion 37A.

Figure 5:
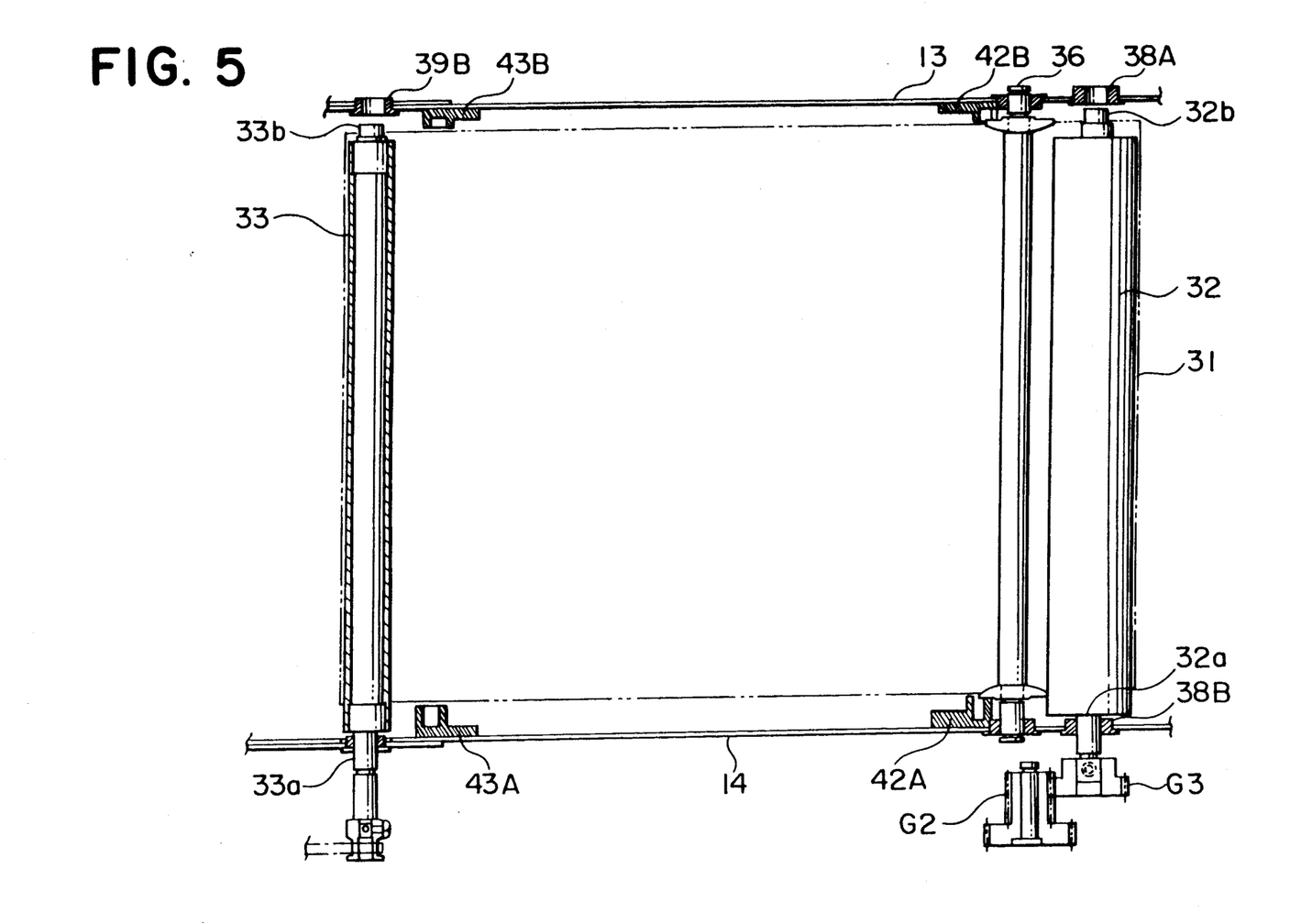
FIG. 5 is a front view of the conveyance section under the condition of replacement of a conveyance belt.

(5) When thrust-regulating member 40 is removed from shaft portion 32a of the aforesaid driving roller 32 by the use of tools or the like, the driving roller 32 goes down due to its own tare weight. In this case, shaft portion 32a at the lower position goes down, sliding inside of bearing 38A, and thereby gear G3 united with shaft portion 32a slides while it keeps engaging with intermediate gear G2, and they stop going down when the end of the larger diameter portion 32C of driving roller 32 hits the inner groove face of bearing 38A. FIG. 5 is a front view showing the state when driving roller 32 stops going down. Under this state, shaft portion 32b at the upper position of driving roller 32 leaves bearing 38B to be free. Therefore, the driving roller 32 is supported at its one side only by the lower bearing 38A, which means that the upper portion of the driving roller 32 can press slightly. Lower shaft portion 32a, however, can not press with a large precession angle because gear G3 located at the shaft end is engaged with intermediate gear G2 and thereby is limited in terms of its movement.

(6) When thrust-regulating member 41 is removed from shaft portion 33a of the aforesaid driven roller 33 by the use of tools or the like, the driven roller 33 goes down due to its own tare weight, and it stops when roller end portion 33C of driven roller 33 hits bearing 39A. In this case, driven roller 33 is supported at its one side only by the lower bearing 39A similarly to the foregoing, and upper shaft portion 33b leaves the bearing 39B to be in a position of free precession. Incidentally, lower shaft portion 33a is slightly restricted in terms of the aforesaid precession because timing belt B keeps being spread between timing belt pulleys P1 and P2. FIGS. 4 and 5 are a perspective view and a front view respectively of document conveyance apparatus 10 wherein backup plate 37 and pressure rollers 34 and 35 are removed and thereby driving roller 32 and driven roller 33 each is lowered to be supported at its one side.

(7) Conveyance belt 31 in an endless form is to be drawn upward passing upper shaft ends of driving roller 32 and driven roller 33. In this case, upper shaft end of driving roller 32 and that of driven roller 33 are free to press and they make it easy to take out conveyance belt 31 in the axial direction.

(8) After conveyance belt 31 has been removed, driving roller 32 is in a position of gear engagement and driven roller 33 is in a position of belt engagement. Therefore, they neither precess sharply nor slip out easily.

(9) When spreading a fresh conveyance belt after conveyance belt 31 has been taken out, aforesaid procedures in reverse sequence are to be taken.

Incidentally, when replacing the conveyance belt, no special jigs and tools for assembly are needed except a screw driver for screwing and unscrewing thrust-regulating members 40 and 41, thereby disassembly and assembly can be performed easily and quickly.

Further, front panel 13, rear panel 14 and bearings 38A, 38B, 39A, 39B, 42A, 42B, 43A and 43B all remain unremoved for the replacement of the conveyance belt. Therefore, positional accuracy of each roller can be assured.

The conveyance belt in the aforesaid explanation is a broad endless belt, but a plurality of endless belts are also effective to be sure.

Not only for the occasion of the replacement of the conveyance belt, but also for the occasion of the replacement of rollers located in the vicinity of running conveyance belt and of the adjustment and replacement of sensors and others arranged inside the conveyance belt, it is easy to work by removing the aforesaid conveyance belt.

Further, as a thrust-regulating member, a quick-disconnecting member other than the aforesaid small screw, such as, for example, an elastic ring, a spring clip and others can be used.

Next, when conveyance belt 31 is replaced with a fresh one or with another belt, the total length of endless form belt before the replacement is different from that after the replacement. Therefore, driven belt 33 must be moved to adjust the belt tension to be constant. For the movement of the driven belt, it has been necessary to adjust in strain, removing the outer casings and various panels of a document conveyance apparatus.

In the present invention, however, it is not necessary to remove the aforesaid items and it is possible to adjust by the use of tools which can be inserted directly into the apparatus with outer casings remaining unremoved.

In FIG. 1, front bearing 39A and rear bearing 39B each supporting shaft portions 33a and 33b of aforesaid driven roller 33, are fixed respectively on sheet-ejecting rear panel 55A and sheet-ejecting front panel 55B. On the sheet-ejecting rear panel 55A, rear bearing 56A supporting one end of rotating shaft 51A of sheet-ejecting driving roller 51 is fixed, while on the sheet-ejecting front panel 55B, front bearing 56B supporting the other end of the aforesaid rotating shaft 51A is fixed. Sheet-ejecting rear panel 55A on which bearings 39A and 56A are fixed can move while contacting the top and side surfaces of the aforesaid rear panel 14. Further, stay 57 and sheet-ejecting guide plates 53A and 53B are provided between sheet-ejecting rear panel 55A and sheet-ejecting front panel 55B to form a solid framework. Further, on sheet-ejecting guide plate 53A, upper sheet-ejecting driven roller 52B is attached, and on the stay 57, lower sheet-ejecting driven roller 52A is attached. Thereby, all of driven roller 33, sheet-ejecting driving roller 51 and sheet-ejecting driven rollers 52A and 52B are arranged to be in parallel to the aforesaid solid framework.

Figure 6:
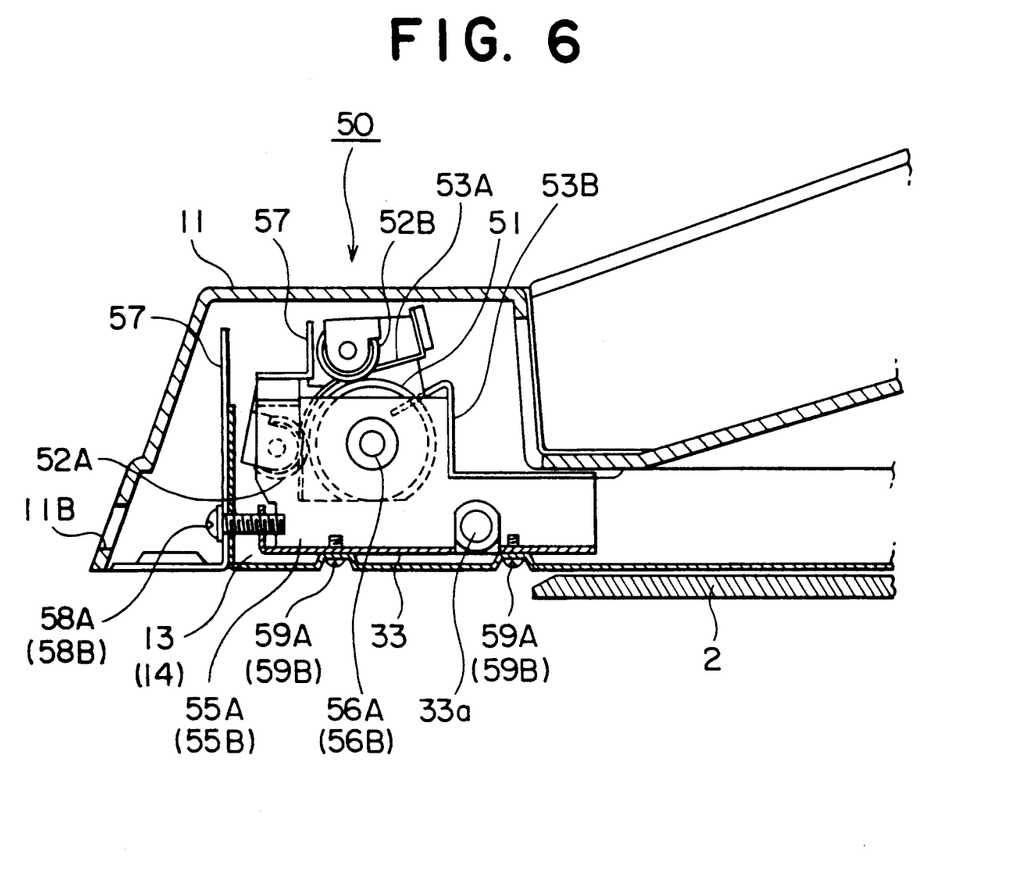
FIG. 6 is a sectional view of a sheet-ejecting section.

FIG. 6 is a sectional view of sheet-ejecting portion 50.

On an erected portion perpendicular to each of the aforesaid sheet-ejecting panels 55A and 55B, a tapped hole is provided. On the other hand, on an erected portion at left end of each of front panel 13 and rear panel 14 each playing a role of a structural member of document conveyance apparatus 10 and on stay 57 that combines and arranges the panels 13 and 14, a through-hole is provided. Further, on the side at left end of outer casing member 11, small openings or cutout holes 11B are provided penetratingly at two locations. Screw member 58A is screwed in the tapped hole on sheet-ejecting rear panel 55A through through-holes on the aforesaid stay 57 and on the rear panel 14. Another screw member 58B, on the other hand, is screwed in a tapped hole on sheet-ejecting front panel 55B through through-holes on stay 57 and on the rear panel 13.

When adjusting the tension of conveyance belt 31, the position of the axis of driven roller 33 around which the belt 31 is wound, is adjusted by moving it. For this purpose, sheet-ejecting rear panel 55A and sheet-ejecting front panel 55B which respectively support shaft portions 33a and 33b of driven roller 33 are to be moved independently for the adjustment. The procedures for moving and adjusting will be enumerated as follows.

(1) Document conveyance apparatus 10 is to be opened and erected almost perpendicularly by lifting handle portion 11A on outer casing member 11 of document conveyance apparatus 10.

(2) Screw members 59A and 59B fixing respectively sheet-ejecting rear panel 55A and sheet-ejecting front panel 55B on rear panel 14 and front panel 13 are to be loosened to be free for the movement.

(3) When each head of screw members 58A and 58B is turned by an adjusting tool such as a screw driver or the like through the small opening 11B on outer casing 11, sheet-ejecting rear panel 55A and sheet-ejecting front panel 55B both engaging respectively with screw members 58A and 58B move from side to side. Therefore, it is necessary to adjust screws at both sides until the proper tension is obtained for conveyance belt 31. In this case, scale marks provided on stay 57 in advance could be a guide for adjustment of rotating angle for screw members 58A and 58B, providing convenience for the adjusting work.

(4) When the tension of conveyance belt 31 has been adjusted, sheet-ejecting rear panel 55A and sheet-adjusting front panel 55B are to be fixed by tightening screw members 59A and 59B. After aforesaid adjustment has been completed, a document can be conveyed normally.

As stated above, a document conveyance apparatus of the invention makes it unnecessary to remove outer casings, frame side plates, bearings and others for the replacement of a conveyance belt and adjustment of its tension. Namely, it is possible to replace a conveyance belt and to adjust its tension with the document conveyance apparatus attached on a copying machine and erected perpendicularly. Therefore, the replacing and adjusting work is easy and the time required for replacement is short, which contributes greatly to the easy work.

Further, assembly accuracy after the replacement and adjustment can easily be assured. Therefore, unskilled persons can also assemble easily and surely.

What is claimed is:

1. An apparatus for conveying a document to an exposing surface of a copier and conveying said document from said exposing surface, comprising:
    a driving roller means for supporting and driving a conveyance belt, including
    (i) at least a pair of driving roller members, each having an axis of rotation, rotatably mounted on a conveyance frame means by a plurality of first supporting members, for driving said conveyance belt suspended thereon, wherein at least one of said driving roller members is driven by a driving means,
    (ii) said first supporting members for supporting both ends of said driving roller members, wherein each of said driving roller members is supported movable in the direction of its axis of rotation so that one end of each of said driving roller members is capable of being removed from said roller supporting members, and
    (iii) a positioning member, mounted on each of said driving roller members, for positioning each of said driving roller members in the direction of its axis of rotation.

2. The apparatus of claim 1, further comprising:
    (a) a pressing roller means for pressing said conveyance belt onto said exposing surface of said copier so that said document between said conveyance belt and said exposing surface is stable when said document is exposed by said copier, said pressing roller means including
    (i) a pressing roller member, having a shaft and rotatably mounted on said conveyance frame means by a second supporting member, for pressing said conveyance belt, and
    (ii) said second supporting member for supporting an end of said shaft of said pressing roller member, wherein said second supporting member is made of elastic material and has an opening which is narrower than the diameter of said shaft of said pressing roller member, so that said pressing roller member is capable of being removed from said second supporting member, and
    (b) a supporting panel for being placed between said driving roller members,
    wherein a side of said supporting panel has a protrusion inserted into said conveyance frame means, and another side of said supporting panel is attached to said conveyance frame means by a fixing member.

3. The apparatus of claim 1,
    wherein one of said driving roller members is mounted on a plate member which is movable by rotating a bolt member attached thereto, so that the tension of said conveyance belt suspended on said driving roller members is capable of being adjusted.

4. An apparatus for conveying a document to an exposing surface of a copier and conveying said document from said exposing surface, comprising:
    a frame;
    a pair of driving rollers, each having an axis of rotation, said driving rollers being rotatably mounted on the frame and supported at each end by the frame, each of said driving rollers being movable in the direction of its axis of rotation to remove one end of each of said driving rollers from said frame;
    a positioning member mounted on a corresponding one of said driving rollers for positioning said corresponding driving roller in the direction of its axis of rotation;
    means for driving at least one of said driving rollers; and
    a conveyance belt mounted on said driving rollers and capable of being driven by said driving rollers.

5. The apparatus of claim 4, further comprising:
    an adjustment member having one of said driving rollers mounted thereon, said adjustment member being movable in a direction substantially perpendicular to the axis of rotation of said one driving roller to adjust the tension of said conveyance belt; and
    means for moving the adjustment member.

6. The apparatus of claim 5, wherein said means for moving the adjustment member includes a bolt member attached to the adjustment member, rotation of the bolt member causing movement of the adjustment member in a direction substantially perpendicular to the axis of rotation of said one driving roller.

7. The apparatus of claim 4, further comprising a supporting panel mounted on said frame between said driving rollers, a protrusion extending from one side of the supporting panel and engaging said frame, and another side of said supporting panel attached to said frame.

8. The apparatus of claim 4, further comprising:
    means for pressing said conveyance belt against said exposing surface of said copier, the pressing means including a pressing roller member having a shaft, the pressing roller member being rotatably mounted on said frame; and
    means for mounting said pressing roller member on the frame, the mounting means including a supporting member made of elastic material, said supporting member supporting an end of said shaft of said pressing roller member and having an opening which is narrower than the diameter of said shaft, said shaft being removable from said supporting member by elastic deformation of said opening.

* * * * *